US008059969B1

(12) United States Patent
Yap

(10) Patent No.: US 8,059,969 B1
(45) Date of Patent: Nov. 15, 2011

(54) ENHANCED LINEARITY RF PHOTONIC LINK

(75) Inventor: Daniel Yap, Newbury Park, CA (US)

(73) Assignee: HRL Laboratories, LLC, Malibu, CA (US)

(*) Notice: Subject to any disclaimer, the term of this patent is extended or adjusted under 35 U.S.C. 154(b) by 593 days.

(21) Appl. No.: 12/141,834

(22) Filed: Jun. 18, 2008

(51) Int. Cl.
H04B 10/04 (2006.01)

(52) U.S. Cl. ........ 398/183; 398/182; 398/140; 398/199; 398/201

(58) Field of Classification Search .................. 398/182, 398/183, 185–188, 199, 201, 140
See application file for complete search history.

(56) References Cited

U.S. PATENT DOCUMENTS

| | | | |
|---|---|---|---|
| 4,541,120 A | 9/1985 | Szabo | |
| 5,076,655 A | 12/1991 | Bridges | |
| 5,291,565 A | 3/1994 | Schaffner et al. | |
| 5,703,706 A * | 12/1997 | Eckstein et al. | 398/80 |
| 5,936,589 A | 8/1999 | Kawahata | |
| 5,940,196 A * | 8/1999 | Piehler et al. | 398/91 |
| 5,963,567 A * | 10/1999 | Veselka et al. | 372/21 |
| 6,246,500 B1 * | 6/2001 | Ackerman | 398/115 |
| 6,418,248 B1 | 7/2002 | Hayes | |
| 6,522,793 B1 | 2/2003 | Szilagyi et al. | |
| 6,703,596 B1 | 3/2004 | Moran | |
| 6,724,523 B2 | 4/2004 | Yap | |
| 6,996,345 B1 * | 2/2006 | Chen | 398/183 |
| 7,133,576 B2 * | 11/2006 | Coldren et al. | 385/1 |
| 7,260,280 B2 | 8/2007 | Ichioka et al. | |
| 7,369,722 B2 | 5/2008 | Yilmaz et al. | |
| 7,486,247 B2 | 2/2009 | Ridgway et al. | |
| 7,558,488 B2 * | 7/2009 | Matsui et al. | 398/201 |
| 7,657,132 B1 * | 2/2010 | Yap et al. | 385/12 |
| 7,660,491 B2 * | 2/2010 | Thaniyavarn | 385/3 |
| 7,738,794 B2 * | 6/2010 | Akiyama et al. | 398/182 |
| 7,835,600 B1 * | 11/2010 | Yap et al. | 385/12 |
| 2002/0105378 A1 | 8/2002 | Tapio | |
| 2004/0067006 A1 * | 4/2004 | Welch et al. | 385/14 |
| 2004/0179825 A1 * | 9/2004 | Im | 386/111 |
| 2006/0270368 A1 | 11/2006 | Caimi et al. | |
| 2008/0069491 A1 | 3/2008 | Kissa et al. | |
| 2009/0051614 A1 | 2/2009 | Wong et al. | |

OTHER PUBLICATIONS

Betts, G.E., et al., "High-Sensitivity Bandpass RF Modulator in LiNbO3," SPIE Integrated Optical Circuit Engineering VI, vol. 993, pp. 110-116 (1988).
Cho, et al., IEEE Journal of Quantum Electronics, vol. QE-13, No. 4, pp. 206-208 (Apr. 1977).

(Continued)

*Primary Examiner* — Kennneth N Vanderpuye
*Assistant Examiner* — Hibret A Woldekidan
(74) *Attorney, Agent, or Firm* — Ladas & Parry

(57) ABSTRACT

A method and apparatus for modulating an RF signal. The RF signal is supplied to a grating modulator having a grating, and light of at least a first wavelength is supplied as a first optical carrier to the grating modulator. The first carrier light is modulated by the grating modulator, wherein the first wavelength of the first carrier coincides with a null in the third derivative of a transmittance spectrum of the grating. Optionally, light of at an additional, second wavelength as a second optical carrier, is supplied to the grating modulator which modulates the second carrier light. The second wavelength of the second carrier coincides with another null, but different than the first mentioned null, in the third derivative of a transmittance spectrum of the grating.

13 Claims, 4 Drawing Sheets

OTHER PUBLICATIONS

Cohn, S.B., et al.,"Optimum Design of Stepped Transmission-line Transformers," IRE Trans. Microwave Theory Tech., vol. 3, No. 3, pp. 16-20 (Apr. 1955).

Cutolo, et al., Applied Physics Letters, vol. 71, No. 2, pp. 199-201 (Jul. 14, 1997).

Emerson and Cumming Microwave Products, Eccostock HiK500F data sheet, www.eccosorb.com, rev. May 11, 2007.

Farwell, et al., IEEE Photonics Technology Letters, vol. 5, No. 7, pp. 779-782 (Jul. 1993).

Ghatak, A.K., et al., "Optical Electronics," pp. 441-447, Cambridge University Press, 1989.

Hsu, R.C., et al., "All-dielectric photonic-assisted radio front-end technology," Nature Photonics, vol., pp. 535-538 (Sep. 2007).

Johnson, et al., IEEE Photonics Techn. Letters, vol. 2, No. 11, pp. 810-811 (Nov. 1990).

Khurgin, et al., Optical Letters, vol. 25, pp. 70-72 (2000).

Kim, et al., Electronics Letters, vol. 41, No. 18 (Sep. 1, 2005).

Lee, R.T., et al.,"A design study for the basic TEM horn antenna," IEEE Antennas and Propagation Magazine, vol. 46, No. 1, pp. 86-92 (Feb. 2004).

lc. MAXIM, Receiver Sensitivity Equation for Spread Spectrum Systems, MAXIM application note 1140, Jun. 28, 2002 www.maxim-ic.com/an1140.

Morito, K., et al., "A Broad-Band MQW Semiconductor Optical Amplifier with High Saturation Output power and Low Noise Figure," IEEE Photon. Technol. Lett. vol. 17, No. 5, pp. 974-976 (May 2005).

NAVSYNC CW20 GPS receiver specification—www.navsync.com.

Ruze. J., "Wide-Angle Metal Plate Optics," Proceedings of the I.R.E., vol. 38, No. 1, pp. 53-59 (Jan. 1950).

Shaw, et al., Electronics Letters, vol. 35, No. 18, pp. 1557-1558 (Sep. 2, 1999).

Shi, W., et al., "Demonstration of Dual-Depletion-Region Electroabsorption modulator at 155 Wavelength for High Speed and Low Driving Voltage Performance," IEEE Photon. Technol. Lett., vol. 17, No. 10, pp. 2068-2070 (Oct. 2005).

Sun, et al., Electronic Letters, vol. 31, No. 11, pp. 902-903 (May 1995).

Taylor, Journal of Lightwave Technology, vol. 17, No. 10, pp. 1875-1883 (Oct. 1999).

Welstand, et al., IEEE Photonics Technology Letters, vol. 7, No. 7, pp. 751-753 (Jul. 1995).

Wood, L., "Opening Statement before the United States Senate committee on the Judiciary, Subcommittee on Terrorism," Mar. 8, 2005.

Bridges and Schaffner, IEEE Transactions on Microwave Theory and Techniques, vol. 43, No. 9, pp. 2184-2197 (Sep. 1995).

U.S. Appl. No. 12/176,089, "Parallel Modulator Photonic Link", Daniel Yap, Filed Jul. 18, 2008.

U.S. Appl. No. 12/176,114, "An RF Receiver Front-End Assembly", James Schaffner, Filed Jul. 18, 2008.

* cited by examiner

ENHANCED LINEARITY RF PHOTONIC LINK

CROSS REFERENCE TO RELATED APPLICATIONS

This application is related to U.S. patent application Ser. No. 12/141,825 filed on the same date as this application and entitled "Optoelectronic modulator and electric-field sensor with multiple optical-waveguide gratings" the disclosure of which is hereby incorporated herein by reference. This application is also related to the following U.S. patent application Ser. No. 12/176,089, filed Jul. 18, 2008 and entitled "Parallel Modulator Photonic Link"; U.S. Ser. No. 12/176,071, filed Jul. 18, 2008 and entitled "Microwave receiver front-end assembly and array"; and U.S. Ser. No. 12/176,114, filed Jul. 18, 2008 and entitled "An RF Receiver Front-End Assembly".

TECHNICAL FIELD

This disclosure relates an RF photonic link that comprises at least one laser, at least one photodetector and a grating modulator. The grating of the modulator has a transmittance spectrum for the light that passes through it. In one embodiment, the laser emits light at a single wavelength, with that wavelength being selected to coincide with a point for which the 3rd derivative of the grating transmittance spectrum is minimized while the 1st derivative of that grating transmittance spectrum has a large value. In another embodiment, the at least one laser emits light at two different wavelengths. Those two wavelengths are chosen to lie on the two edges of the grating transmittance spectrum.

BACKGROUND

The RF photonic link of this disclosure has enhanced linearity because 3rd order distortion products are suppressed. This suppression of the 3rd order distortion is useful for RF photonic links that carry RF signals having a signal bandwidth that is no larger than one octave. Grating modulators generally are considered to have poor linearity. The presently disclosed technology achieves high-linearity performance from grating modulators.

There are a number of commercial applications of RF photonic links. These applications include fiber radio in which signals for wireless RF networks (such as cell phone networks) or links are transported to/from the base stations through optical fiber. These signals have limited bandwidth but are at high carrier frequency, with the carrier frequency ranging from 1 to 60 GHz. The bandwidth of these signals is generally less than 5-10% of the carrier frequency. The signal bandwidth for defense applications can be even larger but many applications still have a bandwidth of less than one octave. The enhanced SFDR (Spur Free Dynamic Range) of the presently disclosed technology is well suited to both the commercial applications and the defense applications.

Some prior optoelectronic modulators have achieved enhanced linearity in their modulation performance by operating them at conditions for which the $3^{rd}$ derivative of the modulator transfer function is minimized. An article by Farwell et al. (*IEEE Photonics Technology Letters*, vol. 5, no. 7, July 1993, pp. 779-782) describes applying a DC bias voltage, in addition to the applied RF signal, to a Mach-Zehnder interferometric modulator so that its operation about that bias point has reduced 3rd order intermodulation products. Other articles, by Welstand et al. (*IEEE Photonics Technology Letters*, vol. 7, no. 7, July 1995, pp. 751-753), and by Sun et al. (*Electronics Letters*, vol. 31, no. 11, 25 May 1995, pp. 902-903) describe applying a DC bias to an electro-absorption modulator such that the transfer function of that modulator has a null in its third derivative for a specific laser wavelength. The presently disclosed technology does not need to apply a DC bias voltage but rather can use the choice of a particular laser wavelength to determine the operating point of the modulator. The primary difference between the present disclosure and these prior art references is the use of the grating modulator.

A prior enhanced-linearity link is described in an article by Johnson and Roussell (*IEEE Photonics Technology Letters*, vol. 2, no. 11, November 1990, pp. 810-811). This link supplies laser light at two optical polarizations, both TE and TM, into the optical waveguide of the modulator. For light of TM polarization, the transfer function of a Mach-Zehnder interferometric modulator has a positive slope with a first shape; for light of TE polarization, the transfer function of that modulator has a negative slope with a second shape. This prior link achieves a suppression of the 3rd order intermodulation distortion in the modulated output by supplying input light of a specific ratio of TE and TM polarizations into the modulator and by applying a specific DC bias voltage to the modulator. At this bias voltage, the 3rd derivative of the transfer function for TE polarization has the opposite sign as the 3rd derivative of the transfer function for TM polarization. Thus, the 3rd-derivative contributions from a combination of both the TE and the TM polarized modulated light can cancel each other. The combination of the TE and TM polarized modulated light actually reduces the effective amount of the linear modulation (arising from the first derivative or slope of those transfer functions, since those slopes also have opposite signs and thus their contributions subtract from each other, too). However, that relatively small reduction in modulation efficiency is acceptable given the substantial suppression of the intermodulation distortion. In contrast to this prior art, for the present disclosure, the contributions to the linear modulation (first derivative of the transfer function) from the two laser wavelengths add to each other whereas the contributions to the distortion (third derivative of the transfer function) cancel each other.

Optical modulators based on a grating formed in an optical waveguide have been described in articles by An, Cho and Matsuo (*IEEE Journal of Quantum Electronics*, vol. QE-13, no. 4, April 1977, pp. 206-208), by Cutolo et al. (*Applied Physics Letters*, vol. 71, no. 2, 14 Jul. 1997, pp. 199-201) and by Kim et al. (*Electronics Letters*, vol. 41, no. 18, 1 Sep. 2005). FIG. 3 shows an illustration of such a grating modulator. This modulator has a waveguide with a grating form in it, similar to the waveguide shown in FIG. 2a. A pair of electrodes is formed alongside the grating waveguide and the RF modulating signal is applied to these electrodes, producing an electric field across the grating waveguide. In general, these prior modulators use non-travelling-wave (or "bulk") RF electrodes to apply the modulation controlling electric field. Those RF electrodes are not part of any RF waveguide. Those "bulk" electrodes typically are connected to an RF signal source by means of an RF cable and wires and represent the termination point for the RF cable. Although FIG. 3 shows laterally placed electrodes, one of the electrodes also could be placed above the grating waveguide, with the other electrode (or electrodes) placed at the sides of the waveguide or at the bottom of the substrate containing the waveguide.

BRIEF DESCRIPTION

This invention is an RF photonic link that preferably comprises at least one laser, at least one photodetector and a grating modulator. The grating of the modulator has a transmittance spectrum for the light that passes through it. In one embodiment, the laser emits light at a single wavelength, with that wavelength being selected to coincide with a point for which the 3rd derivative of the grating transmittance spectrum is minimized while the 1st derivative of that grating transmittance spectrum has a large value. In another embodiment, the at least one laser emits light at two different wavelengths. Those two wavelengths are chosen to lie on the two edges of the grating transmittance spectrum. Also, each of those two wavelengths is selected to coincide with a point for which the 3rd derivative of the grating transmittance spectrum is minimized while the 1st derivative of that grating transmittance spectrum has a large value. Since the specific points on the grating transmittance spectrum where those two wavelengths lie are on opposing edges of the transmittance notch (or reflectance peak or reflection band), the 1st derivative at those two points have opposite signs whereas the 3rd derivative at those two points have the same sign. By separating the two wavelength components of the modulator output and then coupling those two components into a pair of differentially connected photodetectors, the two contributions from the 1st derivative to the modulation can be combined whereas the two contributions from the 3rd derivative to the modulation can be partially cancelled. The 3rd order intermodulation distortion of the RF photonic link is directly related to the 3rd derivative of the grating transmittance spectrum.

In one aspect the present invention provides an enhanced-linearity RF photonic link having at least one grating modulator, the at least one granting modulator having a transmittance spectrum with a notch therein having edges encompassing first and second wavelengths, the transmittance spectrum further having nulls in its third derivative at wavelengths corresponding to said first and second wavelengths and having non-zero values for the first derivative of the transmittance spectrum at wavelengths corresponding to said first and second wavelengths, at least one laser emitting light at two different wavelengths corresponding to said first and second wavelengths, the light of the at least one laser being applied to said at least one grating modulator, and a pair of photodetectors optically coupled to said at least one grating modulator.

In yet another aspect the present invention provides an enhanced-linearity RF photonic link comprising at least one grating modulator, the at least one granting modulator having a transmittance spectrum with a filter characteristic defined by a first wavelength, the transmittance spectrum further having a null in its third derivative at a wavelength corresponding to said first wavelength and having a non-zero value for its first derivative at a wavelength corresponding to said first wavelength, at least one laser emitting light at said first wavelength, the light of the at least one laser being applied to said at least one grating modulator, and at least one photodetector optically coupled to said at least one grating modulator.

In still yet another aspect the present invention provides an method of modulating an RF signal including the steps of supplying the RF signal to an optical modulator having a transmittance spectrum with a notch or a peak in same, and supplying light of at least a first wavelength as a first optical carrier to the optical modulator and modulating the first carrier light by the optical modulator, wherein the first wavelength of the first carrier coincides with a null in the third derivative of said transmittance spectrum and wherein the first wavelength of the first carrier coincides with an edge of said peak or notch.

DETAILED DESCRIPTION

Figure 1:
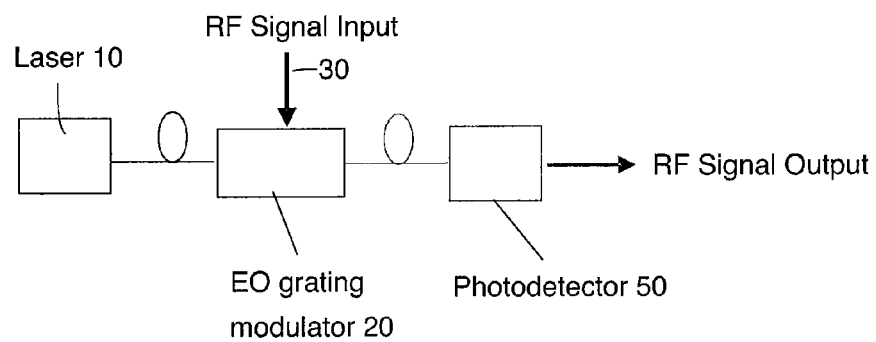
FIG. 1 is a block diagram of an embodiment of the present invention with a grating modulator and a laser that emits light of a specific wavelength.

FIG. 1 shows an embodiment of the present invention that is an RF photonic link that comprises a waveguide-grating modulator 20, a laser 10 and a photodetector 50. The laser 10 emits, preferably, light of a single wavelength that is coupled into the optical waveguide 22 of the modulator 20. An input RF electrical drive signal 30 is supplied to electrodes 24 of the modulator 20. Generally, the RF input signal has a limited bandwidth, which for the purposes of this patent application is considered to be smaller than one octave (with the highest frequency component of the RF input signal being at most a factor of two larger than the lowest frequency component of the RF input signal). The modulated light from the modulator 20 is coupled into the photodetector 50, which produces an RF output signal. For a link having high linearity, that RF output signal has the same frequency components as the RF input signal, differing only in terms of the amplitude and phase of these components.

Figure 2A:
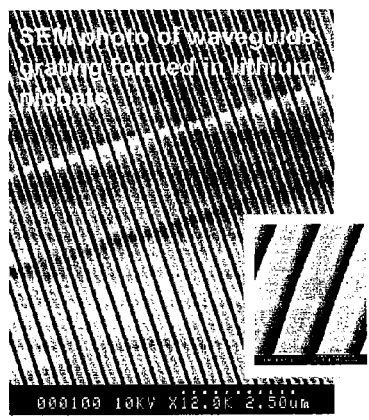
FIG. 2a is an image of a waveguide with an etched grating and FIG. 2b is a graph of an exemplary spectral response of an ideal grating.
Figure 2B:
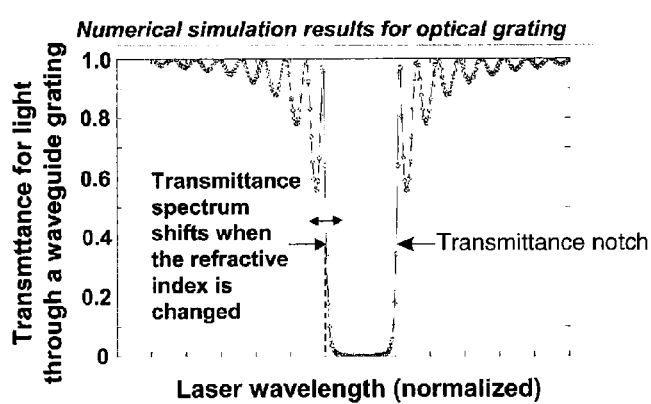

A grating formed in an optical waveguide has a periodic spatial variation in its optical refractive index. There are several known methods to form such a grating, with one method being to etch a periodic surface relief into a dielectric optical waveguide. FIG. 2a shows a photograph, taken with the assistance of a scanning electron microscope, of such a surface grating that has been etched into a titanium-diffused lithium niobate waveguide. A grating waveguide acts as a distributed Bragg reflector that can reflect certain wavelengths of the light propagating through the grating waveguide, transmit other wavelengths of the light and partially reflect yet other wavelengths of the light. An exemplary transmission spectrum of a grating is shown in FIG. 2b. For a waveguide-grating modulator, at least the grating and typically also the rest of the optical waveguide is constructed in an electro-optic (EO) material. The refractive index of that material changes when that material is exposed to an electric field. The change in refractive index shifts the grating transmittance spectrum, as illustrated in FIG. 2b, toward longer or shorter wavelengths.

Optical modulators based on a grating formed in an optical waveguide have been described in the articles noted above.

Figure 3:
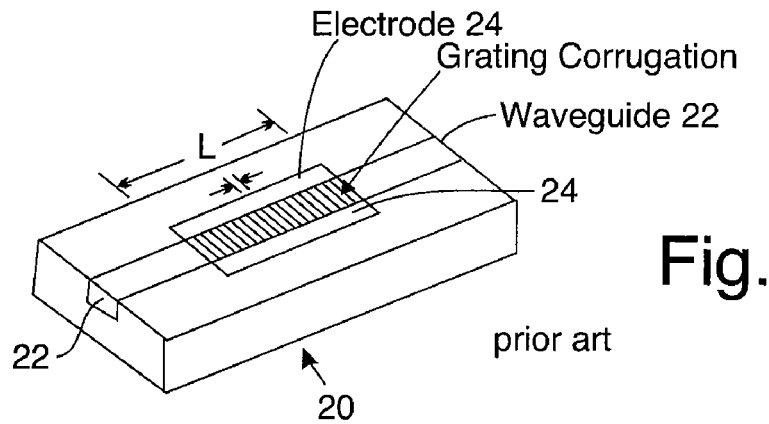
FIG. 3 illustrates a prior art single-grating optical modulator.

FIG. 3 shows an illustration of such a grating modulator. This modulator has a waveguide with a grating form in it, similar to the waveguide shown in FIG. 2a. A pair of electrodes is formed alongside the grating waveguide and the RF modulating signal is applied to these electrodes, producing an electric field across the grating waveguide. In general, these prior modulators use non-travelling-wave (or "bulk") RF electrodes to apply the modulation controlling electric field. Those RF electrodes are not part of any RF waveguide. Those "bulk" electrodes typically are connected to an RF signal source by means of an RF cable and wires and represent the termination point for the RF cable. Although FIG. 3 shows laterally placed electrodes, one of the electrodes also could be placed above the grating waveguide, with the other electrode (or electrodes) placed at the sides of the waveguide or at the bottom of the substrate containing the waveguide. Related U.S. patent application Ser. No. 12/141,825 entitled "Optoelectronic modulator and electric-field sensor with multiple optical-waveguide gratings", filed on the same date as this application describes a grating-based optical modulator for which the RF electrodes are part of an RF waveguide. The RF field propagates along the RF waveguide in a direction that is perpendicular to the direction in which the light propagates through the optical waveguide. In that disclosure, the two electrodes are located above and below the grating waveguide.

In the presently disclosed technology, the wavelength of the light to be modulated preferably coincides with one of the two edges of the reflection band of the grating transmittance spectrum, as indicated in FIG. 2b by the dashed Me. A time-periodic electric field produces a time-periodic change in the transmittance for that wavelength of the light. The result is a time-periodic modulation of the intensity of the transmitted light as well as of the reflected light. As an example, FIG. 2b illustrates the laser wavelength being on the shorter wavelength edge of a transmission notch or reflection band of the spectrum. However, a wavelength on the longer wavelength edge of the spectrum also could be used.

When the light is modulated at a grating by a sinusoidal (single-frequency) RF signal, additional modulation sidebands are produced in the optical spectrum of the light. The optical wavelength or frequency of those sidebands is spaced from the wavelength of the input light by an amount equal to the wavelength or frequency of the RF signal. In general, for intensity modulation of the light, two modulation sideband are produced—one sideband being at a longer wavelength and one sideband being at a shorter wavelength.

Figure 4:
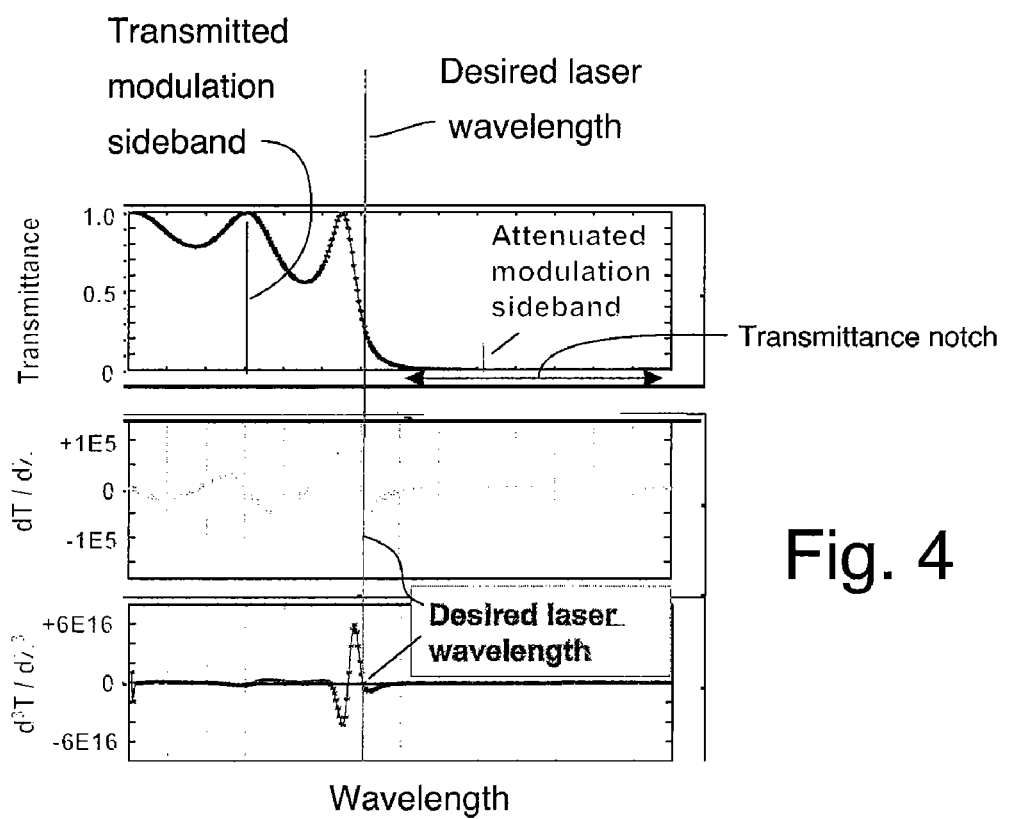
FIG. 4 is a graph of the spectral response of a grating, showing the calculated transmittance, $1^{st}$ derivative of the transmittance, and $3^{rd}$ derivative of the transmittance of the grating.

In some embodiments, the grating is preferably designed such that a first modulation sidebands lies within the "stopband" of the grating spectrum (where the reflectance is high). This sideband is attenuated. A second modulation sideband has a wavelength or frequency that coincides with a region of the spectrum for which the transmittance is at a maximum. This other sideband experiences little modulation. Since the sideband itself is not modulated, there is no production of additional sidebands (additional distortion) due to that modulation. This placement of the modulation sidebands is illustrated in the upper panel of FIG. 4, which shows a more detailed plot of the left side of a grating transmittance spectrum. In general, the RF signal does not comprise a single wavelength or frequency but rather comprises a band of wavelengths or frequencies. Preferably, the spectral width over which the grating transmittance is near a maximum is large compared with the bandwidth of the RF signal. In this way, there is less distortion of the modulated light.

When the bandwidth of the RF waveform is smaller than one octave, what is important is the third derivative of the grating-transmittance spectrum rather than both the second derivative and the third derivative. An embodiment that is suitable for such cases has the wavelength of the input light coincide with the specific portion of the slope of the grating transmittance spectrum at which the third derivative is equal to zero. This choice of optical wavelength also is illustrated in the lower two panels of FIG. 4. The third derivative is nulled at several values of the wavelength. The choice of wavelength also is constrained by the desire to have a large magnitude for the first derivative of the grating transmittance spectrum. Note that the first derivative of that grating transmittance provides an indication of the depth of modulation that can be achieved for a given magnitude of the RF signal. The choice of wavelength also is constrained to coincide with an edge of the notch in the grating transmittance spectrum.

The nulling of the third derivative results in a suppression of the $3^{rd}$ order intermodulation distortion over a small range of input RF signals. In essence the third derivative only crosses zero and then becomes larger again. It is desirable to have that third derivative be suppressed over a larger range of inputs. This enhanced suppression is achieved in the following embodiment.

Figure 5:
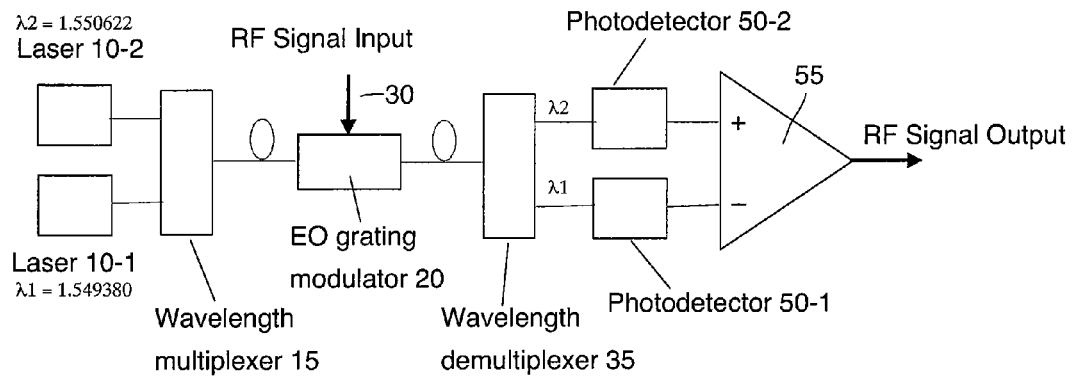
FIG. 5 is a block diagram of another embodiment of the present invention with a grating modulator, two lasers that emit at different specific wavelengths and a pair of differential-connected photodetectors.

FIGS. 3 and 5 illustrate a second embodiment of the invention, which is an RF photonic link that comprises, again, a grating modulator 20 but now there are two lasers 10-1 and 10-2 whose emitted light is coupled to the grating modulator 20. An optical wavelength multiplexer 15 can be used to accomplish that coupling. Each laser emits light of specific wavelength, with the choice of wavelength described below. As in the first embodiment, an RF input signal is supplied to the grating modulator 20 and modulates the refractive index of the EO material of the modulator 20. In this embodiment the modulated output of the grating modulator 20 is supplied to a wavelength demultiplexer 35 that separates the components of modulated light corresponding to the two laser wavelengths (the same laser wavelengths as selected for the two lasers 10-1 and 10-2). These two components are then coupled into two photodetectors 50-1 and 50-2 used in a differential configuration, with each photodetector producing a demodulated RF output. For example, the RF output from one photodetector is supplied to the positive input of a differential amplifier 55 and the RF output from the other photodetector is supplied to the negative (or inverting) input of that differential amplifier 55. The output of the differential amplifier 55 is the desired RF output signal. Other differential configurations of photodetectors are known in the art and may be utilized if desired.

Figure 6:
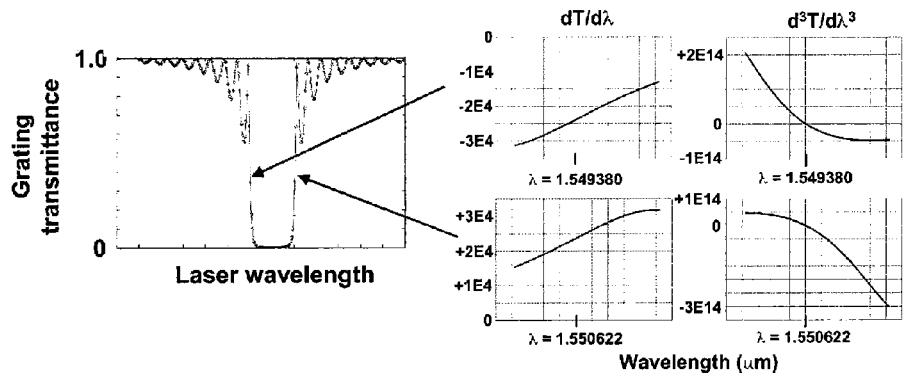
FIG. 6 illustrates the calculated grating transmittance spectrum and the first derivative and third derivative of that spectrum.

For this embodiment, a first laser 10-1 emits light whose wavelength λ1 coincides with one edge of the notch in the grating transmittance spectrum (such as the falling edge). A second laser emits light whose wavelength coincides with the other edge of the notch in that grating transmittance spectrum (such as the rising edge). FIG. 6 shows an example of a transmittance spectrum of the grating in modulator 20. The first derivative and the third derivative of that spectrum also are shown, calculated near two wavelengths for which a null occurs in the third derivative. The first derivative have a non-zero value for the wavelengths for which the third derivate is nulled. One wavelength is at the rising edge of the transmittance notch and the other wavelength is at the falling edge of the transmittance notch. Note that for the wavelengths on the falling edge of the notch, the first derivative of the spectrum has a negative value. Also, the third derivative of the spectrum crosses zero and has a negative slope. For the wavelengths on the rising edge of the notch, the first derivative has a positive value and the third derivative crosses zero and, again, has a negative slope. The two laser wavelengths are selected to coincide with the wavelength-values of the spectrum for which the third derivatives cross zero. As the RF signal is applied, the transmittance (and the first and third derivatives) swings to the right and to the left of this operating point. The first derivative of the transmittance corresponds to the modulation of the input light. If the two first derivatives are subtracted from each other, the net result is an even larger change in transmittance, and thus an even larger modulation of the intensity of that light. If the two third derivatives are subtracted from each other, the net result (since those components have the same sign) is a partial cancellation of the contributions from the third derivatives. The third derivative of the transmittance is related to the $3^{rd}$ order intermodulation distortion produced by the modulator.

The wavelengths of the lasers (1.549380 μm and 1.550622 μm) were selected so that at those wavelengths the third derivative of the grating transmittance has a zero crossing and is null, but the invention is not limited to lasers of those wavelengths as particular applications will likely suggest the use of lasers having different wavelengths and, in particular, the selection of a particular grating tends to drive the selection of the wavelengths of the lasers 10-1 and 10-2 as already described.

Note from FIG. 6 that the two curves for the third derivatives do not exactly have the same slope. One curve, for the shorter-wavelength operating point, rises steeply to the left of the operating point and saturates to the right of that operating point. The other curve, for the longer-wavelength operating point, saturates to the left of that operating point and falls steeply to the right of that operating point. Nevertheless, there is a region of wavelengths, and thus a region of changes in refractive index, over which the third derivatives almost perfectly cancel each other.

Figure 7:
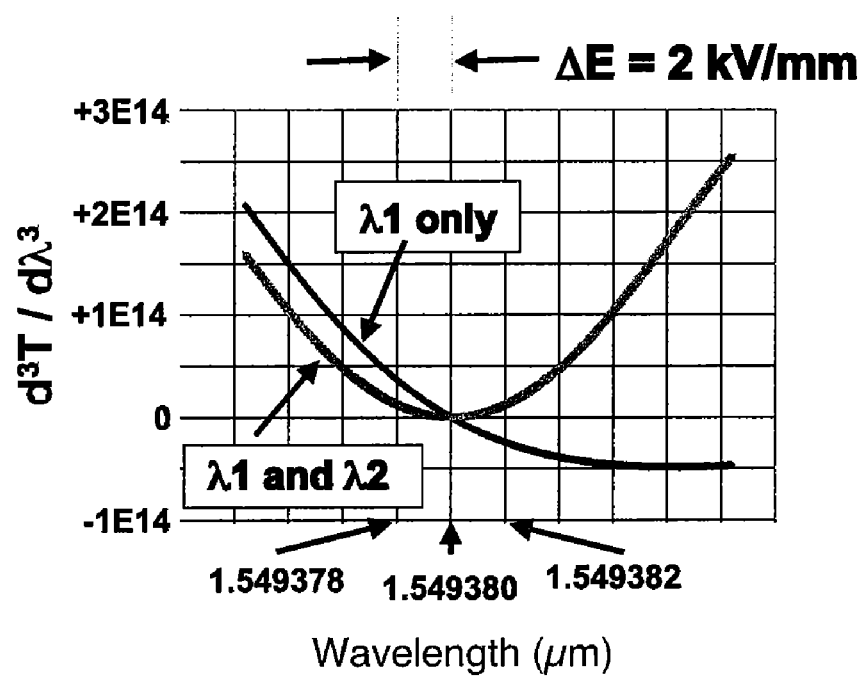
FIG. 7 illustrates the calculated difference of the contributions from the third-derivative components near two laser wavelengths where the third-derivative of the grating transmittance spectrum has a null.

FIG. 7 shows the results of subtracting one of the curves for the third derivative from the other curve for the third derivative. The third derivative at the shorter-wavelength operating point is subtracted from the third derivative at the longer-wavelength operating point. Also shown on FIG. 7 is the third derivative obtained for only one laser wavelength (representing the performance of the first embodiment) with that wavelength being near the shorter-wavelength operating point. For a symmetric swing in wavelength (or refractive index) about that operating point, there is a fairly large range of wavelengths over which the two-wavelength embodiment achieves even lower distortion (smaller contribution from the third derivative) than the single-wavelength embodiment. If one assumes that the EO material is lithium niobate with an electro-optic coefficient of 30 picometers/volt, the swing in the amplitude of the input RF electric field over which the two-wavelength embodiment has better performance is greater than 2 kV/mm. If one assumes that the gap between the two electrodes of the grating modulator is 10 micrometers, this represents an applied voltage swing of ±20 volts.

The approach of operating at two wavelengths with the intermodulation distortion due to each of those two wavelengths canceling each other is not limited to RF photonic links comprising grating modulators. It also could be applied effectively to other modulators that have a transmittance spectrum or reflectance spectrum that has a peak with two edges or a null with two edges. For example, a modulator based on a Fabry-Perot resonator has such a transmittance spectrum. Also, a modulator based on a ring or disk resonator has such a transmittance spectrum. These modulators need not comprise a single grating or a single resonator. These modulators also could comprise multiple gratings or resonators.

In the embodiments of the aforementioned figures, grating modulators are preferably employed and the selected two wavelengths correspond to edges of the notch in the transmittance spectrum. If a Fabry-Perot resonator or a ring or a disk modulator is used instead, the selected two wavelengths correspond to edges of the peak in the transmittance spectrum. In either case, the selected two waveguides coincide with nulls in the 3rd derivative of the transmittance spectrum. Also in the vicinity of these two selected wavelengths their 3rd derivatives of the transmittance spectrum should have slopes which are either both positive or both negative. The values of the 1st derivative of the transmittance spectrum at these two selected wavelengths will have opposite signs (i.e. one will be positive and the other negative). Also, in the vicinity of the two wavelengths, the slopes of the first derivatives of the transmittance spectrum should preferably have the same sign (i.e. preferably either will be both positive or both negative).

Having described this invention in connection with several embodiments and applications of same, further embodiments and/or applications will doubtlessly suggest themselves to those skilled in the art. As such the invention is not to be limited to the disclosed embodiments or to the disclosed applications for using same unless specifically required by the appended claims.

What is claimed is:

1. An enhanced-linearity RF photonic link comprising;
   a. at least one grating modulator, the at least one granting modulator having a transmittance spectrum with a notch therein having edges encompassing first and second wavelengths, the transmittance spectrum further having nulls in its third derivative at wavelengths corresponding to said first and second wavelengths and having non-zero values for the first derivative of the transmittance spectrum at wavelengths corresponding to said first and second wavelengths,
   b. at least one laser emitting light at two different wavelengths corresponding to said first and second wavelengths, the light of the at least one laser being applied to said at least one grating modulator, and
   c. a pair of photodetectors optically coupled to said at least one grating modulator.

2. The enhanced-linearity RF photonic link of claim 1 further comprising an electronic differential amplifier connected to electrical outputs of the pair of photodetectors, one photodetector having an output being connected to a non-inverting input of the differential amplifier and the other photodetector having an output is connected to an inverting input of the differential amplifier.

3. The enhanced-linearity RF photonic link of claim 1 further comprising a wavelength multiplexer for combining the light, at said first and second wavelengths, emitted from the at least one laser, before the light is applied to said at least one grating modulator.

4. The enhanced-linearity RF photonic link of claim 3 further comprising a wavelength demultiplexer that separates the light from the grating modulator into two modulated optical signals that are supplied to the two photodetectors of the pair of photodetectors.

5. The enhanced-linearity RF photonic link of claim 1 wherein said third derivative is equal to zero at said nulls corresponding to said first and second wavelengths.

6. An enhanced-linearity RF photonic link comprising;
   a. at least one grating modulator, the at least one granting modulator having a transmittance spectrum with a filter characteristic defined by a first wavelength, the transmittance spectrum further having a null in its third derivative at a wavelength corresponding to said first wavelength and having a non-zero value for its first derivative at a wavelength corresponding to said first wavelength,
b. at least one laser emitting light at said first wavelength, the light of the at least one laser being applied to said at least one grating modulator, and
c. at least one photodetector optically coupled to said at least one grating modulator.

7. The enhanced-linearity RF photonic link of claim 6 wherein said third derivative is equal to zero at said null corresponding to said first wavelength.

8. A method of modulating an RF signal comprising:
supplying the RF signal to an optical modulator having a transmittance spectrum with a notch or a peak in same, and
supplying light of at least a first wavelength as a first optical carrier to the optical modulator and modulating the first carrier light by the optical modulator, wherein the first wavelength of the first carrier coincides with a null in the third derivative of said transmittance spectrum and wherein the first wavelength of the first carrier coincides with an edge of said peak or notch.

9. The method of claim 8 wherein the supplying light includes supplying light of at an additional, second wavelength as a second optical carrier and modulating the second carrier light by the optical modulator, wherein the second wavelength of the second carrier coincides with another null, different than the first mentioned null, in the third derivative of said transmittance spectrum and wherein the second wavelength of the second carrier coincides with a second edge of said peak or notch.

10. The method of claim 9 wherein the first and second wavelengths coincide with wavelengths in the transmittance spectrum of the optical modulator for which values of first derivative of the transmittance spectrum are non-zero and have opposite signs.

11. The method of claim 10 further including detecting modulated light produced by the optical modulator using at least two photodetectors and producing an output RF signal based on outputs from the photodetectors.

12. The method of claim 8 further including detecting modulated light produced by the optical modulator using at least one photodetector to detect the modulated light and producing an output RF signal based on at least an output from the at least one photodetector.

13. The method of claim 8 wherein the third derivative of said transmittance spectrum is equal to zero at said null corresponding to said first wavelength.

\* \* \* \* \*